US010315436B2

(12) United States Patent
Ozawa

(10) Patent No.: US 10,315,436 B2
(45) Date of Patent: Jun. 11, 2019

(54) CONTROL DEVICE AND METHOD FOR PRINTING FIRST IMAGE AND SECOND IMAGE

(71) Applicant: BROTHER KOGYO KABUSHIKI KAISHA, Nagoya, Aichi (JP)

(72) Inventor: Ryohei Ozawa, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 63 days.

(21) Appl. No.: 15/469,621

(22) Filed: Mar. 27, 2017

(65) Prior Publication Data

US 2017/0282590 A1 Oct. 5, 2017

(30) Foreign Application Priority Data

Mar. 31, 2016 (JP) .................................. 2016-071326

(51) Int. Cl.
*G06K 15/02* (2006.01)
*B41J 2/21* (2006.01)
*B41J 2/045* (2006.01)
*B41J 11/00* (2006.01)
*B41J 29/38* (2006.01)
*B42D 25/30* (2014.01)

(52) U.S. Cl.
CPC ......... *B41J 2/2132* (2013.01); *B41J 2/04501* (2013.01); *B41J 11/007* (2013.01); *B41J 11/008* (2013.01); *B41J 29/38* (2013.01); *B42D 25/30* (2014.10); *G06K 15/18* (2013.01); *G06K 15/1868* (2013.01); *G06K 15/1889* (2013.01)

(58) Field of Classification Search
CPC ...... B41J 2/2132; B41J 11/008; B41J 11/007; B41J 2/04501; B41J 29/38; G06K 15/18; G06K 15/1889; G06K 15/1868; B42D 25/30

See application file for complete search history.

(56) References Cited

U.S. PATENT DOCUMENTS

| 6,721,439 B1 | 4/2004 | Levy et al. |
| 2007/0171459 A1* | 7/2007 | Dawson ................ G06F 3/1206 358/1.15 |
| 2013/0070009 A1 | 3/2013 | Yoshida |

(Continued)

FOREIGN PATENT DOCUMENTS

| JP | 2000-168183 A | 6/2000 |
| JP | 2005-088387 A | 4/2005 |
| JP | 2006-344106 A | 12/2006 |

(Continued)

*Primary Examiner* — Yaovi M Ameh
(74) *Attorney, Agent, or Firm* — Scully, Scott, Murphy & Presser, PC

(57) ABSTRACT

A control device for controlling a printer includes a conveyer and a print head. The control device performs: acquiring first image data representing a first image and second image data representing a second image; determining, based on the first image, a plurality of head positions of the print head relative to the first image; and determining a relative position of the second image relative to the first image such that, when the number of partial printings for printing the first image and the second image is increased from the number of partial printings for printing the first image, the relative position can minimize the increment.

15 Claims, 10 Drawing Sheets

(56) References Cited

U.S. PATENT DOCUMENTS

2017/0282591 A1* 10/2017 Ozawa .................. B41J 2/2132

FOREIGN PATENT DOCUMENTS

| JP | 2007-045133 A | 2/2007 |
| JP | 2009-023214 A | 2/2009 |
| JP | 4226897 B2 | 2/2009 |
| JP | 2013-063538 A | 4/2013 |
| JP | 2013-065955 A | 4/2013 |

* cited by examiner

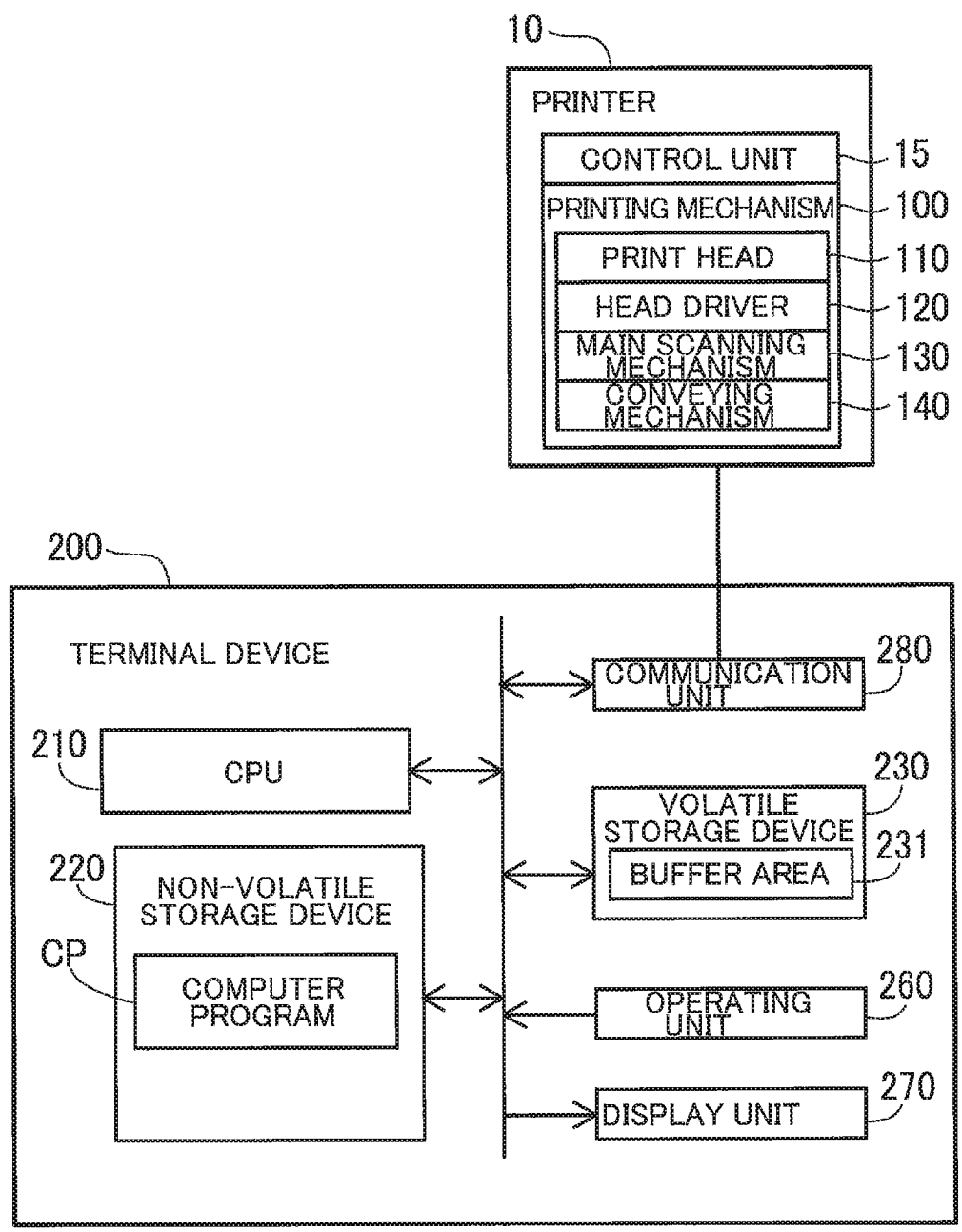

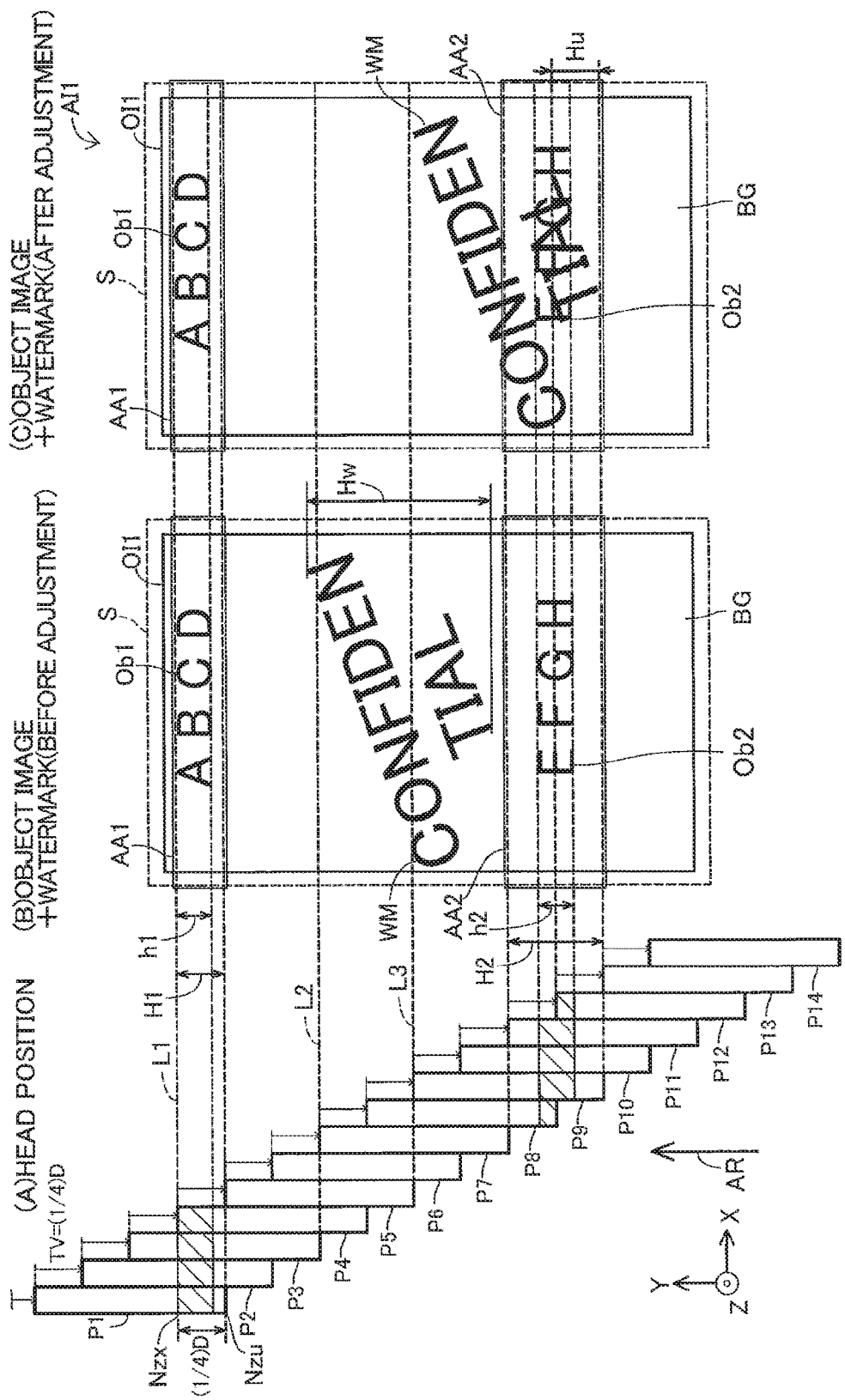

MODIFICATION

CONTROL DEVICE AND METHOD FOR PRINTING FIRST IMAGE AND SECOND IMAGE

CROSS REFERENCE TO RELATED APPLICATION

This application claims priority from Japanese Patent Application No. 2016-071326 filed Mar. 31, 2016. The entire content of the priority application is incorporated herein by reference.

TECHNICAL FIELD

The present disclosure relates to a technology for printing an image including first and second images.

BACKGROUND

There is known a technology that, when a plurality of document sets each including a plurality of pages are printed, adds different marks for each page group of each document set.

SUMMARY

However, in the above technology, sufficient consideration has not been given to the position to which a mark is added. Thus, a time required for printing a marked page may become excessively long. Such a problem may occur not only in printing of the marked page but also in printing of an image including a first image and a second image.

The present specification discloses a technology that can prevent a time required for printing a first image and a second image from increasing as compared to a case where only a first image is printed.

It is therefore an object of the disclosure (in particular a first embodiment described herein) to provide a control device for controlling a printer that is configured to alternatively perform partial printing and sheet conveying. The printer includes a conveyer and a print head. The conveyer is configured to convey a sheet in a conveying direction in the sheet conveying. The print head has a plurality of nozzles each configured to eject a droplet of ink onto the sheet. The print head is configured to print a part of a print image in the partial printing. The control device includes a processor including hardware, and a memory storing computer-readable instructions therein. The computer-readable instructions, when executed by the processor, causes the control device to perform: acquiring first image data representing a first image to be printed and second image data representing a second image to be printed with the first image data; determining, based on the first image, a plurality of head positions of the print head relative to the first image in the conveying direction; determining a relative position of the second image relative to the first image in the conveying direction such that, if the number of partial printings for printing the first image and the second image is increased from the number of partial printings for printing the first image, the relative position can minimize the increment; generating, using the first image data and the second image data, arrangement image data representing an arrangement image including the first image and the second image positioned at the relative position relative to the first image; and supplying, to the printer, the arrangement image data as print image data representing the print image.

According to one aspect, the disclosure provides a non-transitory computer readable storage medium storing a set of program instructions installed on and executed by a computer for controlling a printer. The printer is configured to alternatively perform partial printing and sheet conveying. The printer includes a conveyer and a print head. The conveyer is configured to convey a sheet in a conveying direction in the sheet conveying. The print head has a plurality of nozzles each configured to eject a droplet of ink onto the sheet. The print head is configured to print a part of a print image in the partial printing. The program instructions includes: acquiring first image data representing a first image to be printed and second image data representing a second image to be printed with the first image data; determining, based on the first image, a plurality of head positions of the print head relative to the first image in the conveying direction; determining a relative position of the second image relative to the first image in the conveying direction such that, if the number of partial printings for printing the first image and the second image is increased from the number of partial printings for printing the first image, the relative position can minimize the increment; generating, using the first image data and the second image data, arrangement image data representing an arrangement image including the first image and the second image positioned at the relative position relative to the first image; and supplying, to the printer, the arrangement image data as print image data representing the print image.

According to another aspect, the disclosure provides a method for controlling a printer. The printer is configured to alternatively perform partial printing and sheet conveying. The printer includes a conveyer and a print head. The conveyer is configured to convey a sheet in a conveying direction in the sheet conveying. The print head has a plurality of nozzles each configured to eject a droplet of ink onto the sheet. The print head is configured to print a part of a print image in the partial printing. The method includes: acquiring first image data representing a first image to be printed and second image data representing a second image to be printed with the first image data; determining, based on the first image, a plurality of head positions of the print head relative to the first image in the conveying direction; determining a relative position of the second image relative to the first image in the conveying direction such that, if the number of partial printings for printing the first image and the second image is increased from the number of partial printings for printing the first image, the relative position can minimize the increment; generating, using the first image data and the second image data, arrangement image data representing an arrangement image including the first image and the second image positioned at the relative position relative to the first image; and supplying, to the printer, the arrangement image data as print image data representing the print image.

BRIEF DESCRIPTION OF THE DRAWINGS

The particular features and advantages of the disclosure will become apparent from the following description taken in connection with the accompanying drawings, in which:

FIG. 1 is a block diagram illustrating configurations of a terminal device and a printer according to an embodiment;

FIG. 3 is a first drawing illustrating a relationship between a target image, a watermark, and a head position according to the embodiment;

DETAILED DESCRIPTION

A. Embodiment

A1: Configuration of Terminal Device 200

Figure 2A:
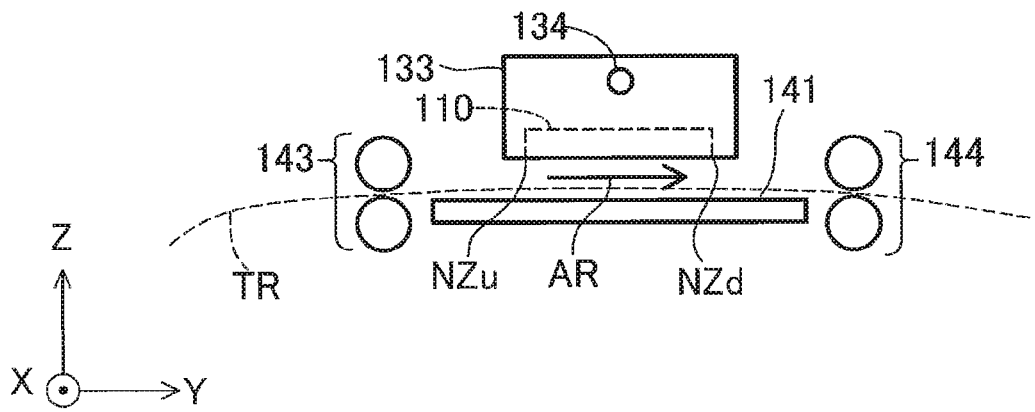
FIGS. 2A and 2B are explanatory views of a printing mechanism according to the embodiment.

The present invention will be described based on an embodiment. FIG. 1 is a block diagram illustrating configurations of a terminal device 200 as a control device in the embodiment and a printer 10 as a printing unit.

The terminal device 200 is, for example, a personal computer and includes a CPU 210 as a controller for controlling the operation of the terminal device 200, a non-volatile storage device 220 such as a hard disk, a volatile storage device 230 such a RAM, an operating unit 260 such as a mouse or a keyboard, a display unit 270 such as a liquid crystal display, and a communication unit 280. The terminal device 200 is communicably connected to an external device such as the printer 10 through the communication unit 280.

The volatile storage device 230 provides a buffer area 231 that temporarily stores various intermediate data generated when the CPU 210 performs processing. The non-volatile storage device 220 stores a computer program CP. In the present embodiment, the computer program CP is a printer driver program for controlling the printer 10 and is provided by being downloaded from a server. Alternatively, the computer program CP may be provided by being stored in a DVD-ROM. The CPU 210 executes the computer program CP to thereby execute print processing to be described later.

The printer 10 includes an inkjet printing mechanism 100 and a control unit 15 including a CPU for controlling the inkjet printing mechanism 100 and a memory.

The printing mechanism 100 performs printing by ejecting inks (ink droplets) of different colors: cyan (C), magenta (M), yellow (Y), and black (K). The printing mechanism 100 includes a print head 110, a head driver 120, a main scanning mechanism 130, and a conveying mechanism 140.

Figure 2B:
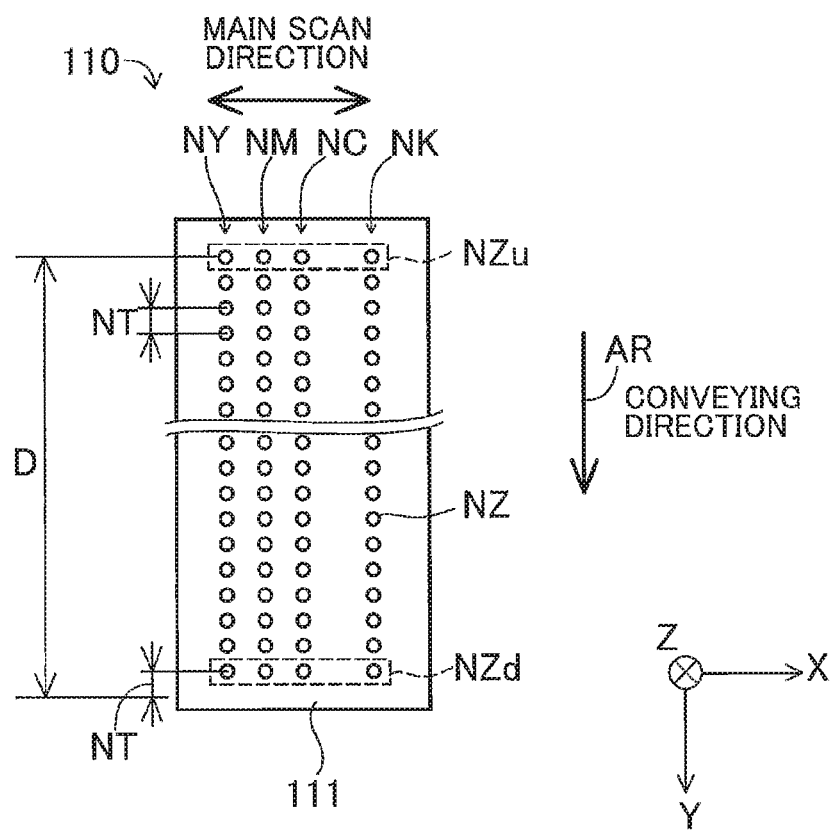

FIGS. 2A and 2B are explanatory views of the printing mechanism 100. FIG. 2A schematically illustrates a configuration of the printing mechanism 100, and FIG. 2B illustrates a configuration of the print head 110 as viewed from below in FIG. 2A. The conveying direction AR illustrated in FIGS. 2A and 2B is a sheet conveying direction (+Y direction) between the print head 110 and a platen 141. Hereinafter, the downstream side (+Y side) of the conveying direction AR is referred to merely as "downstream side", and the upstream side (−Y side) of the conveying direction AR is referred to merely as "upstream side". For example, the conveying mechanism 140 has a plurality of sheet holding parts including an upstream side roller pair 143 disposed upstream of the print head 110 and a downstream side roller pair 144 disposed downstream of the print head 110. The conveying mechanism 140 drives the sheet holding parts by means of a non-illustrated conveying motor to convey a sheet in the conveying direction AR along a conveying path TR extending from a non-illustrated sheet supply tray, passing through between the platen 141 and the print head 110, to a non-illustrated sheet discharge tray.

The main scanning mechanism 130 includes a carriage 133 that carries the print head 110 and a sliding shaft 134 that holds the carriage 133 so as to be reciprocally movable in a main scan direction (X-axis direction). The main scanning mechanism 130 uses power of a non-illustrated main scanning motor to reciprocate the carriage 133 along the sliding shaft 134, whereby main scanning that reciprocates the print head 110 in the main scan direction is achieved.

As illustrated in FIG. 2B, a nozzle formation surface 111 of the print head 110 that is opposite to the platen 141 has a plurality of nozzle arrays each constituted of a plurality nozzles, i.e., nozzle arrays NC, NM, NY, and NK that eject the above-mentioned inks of C, M, Y, and K. Each nozzle array includes a plurality of nozzles NZ. The plurality of nozzles NZ are different in position in the conveying direction and arranged at a predetermined nozzle interval NT along the conveying direction (AR). The nozzle interval NT is the length between two nozzles NZ adjacently disposed in the conveying direction (AR). The most upstream side (−Y side) nozzle NZ among the nozzles constituting each nozzle array is referred to as "most upstream side nozzle NZu". Further, the most downstream side (+Y side) nozzle NZ among the nozzles constituting each nozzle array is referred to as "most downstream side nozzle NZd". The length obtained by adding the nozzle interval NT to the length between the most upstream side nozzle NZu and the most downstream side nozzle NZd is referred to as "nozzle length D".

The head driver 120 drives the print head 110 reciprocated by the main scanning mechanism 130 on a sheet S conveyed by the conveying mechanism 140. As a result, the ink droplets are ejected from the plurality of nozzles NZ of the print head 110 onto the sheet S, whereby an image is printed on the sheet S.

The control unit 15 (FIG. 1) controls the head driver 120, main scanning mechanism 130, and conveying mechanism 140 to repeat a partial printing operation SP and a sheet conveying operation T many times in an alternate way. In a single partial printing operation SP, the ink droplets are ejected onto the sheet S from the nozzles NZ of the print head 110 while a single main scanning operation is performed with the sheet S held in a stopped state on the platen 141, whereby a part of the image to be printed is printed on the sheet S. In a single sheet conveying operation T, the sheet S is moved in the conveying direction AR by a predetermined conveyance amount.

FIGS. 3A to 3C are a first view illustrating the relationship among an object image OI1, a watermark WM, and head positions P. FIG. 3 (part A) illustrates the head positions P, i.e., the relative position of the print head 110 in the conveying direction with respect to the object image OI1 for each partial printing operation SP (i.e., for each main scanning operation). More specifically, in FIG. 3 (part A), 14 head positions P1 to P14 corresponding to 14 partial printing operations SP are illustrated. Pass numbers n (n is an integer equal to or larger than 1 and equal to or smaller than 14) are given to the 14 partial printing operations SP in the execution order, and the n-th partial printing operation SP is referred to as "partial printing operation SPn". The head position P corresponding to the partial printing operation SPn is referred to as "head position Pn". The sheet conveying operation T performed between the n-th partial printing operation SPn and the (n+1)-th partial printing operation SP(n+1) is referred to as "n-th sheet conveying operation T(n)".

The printer 10 of the present embodiment performs printing in a 4-pass printing mode, in which one area is printed using four partial printing operations SP. In the 4-pass printing, the conveyance amount TV in all the sheet conveying operations T(1) to T(13) is ¼ of the nozzle length D (TV=(¼)D).

A-2. Print Processing

Figure 4:
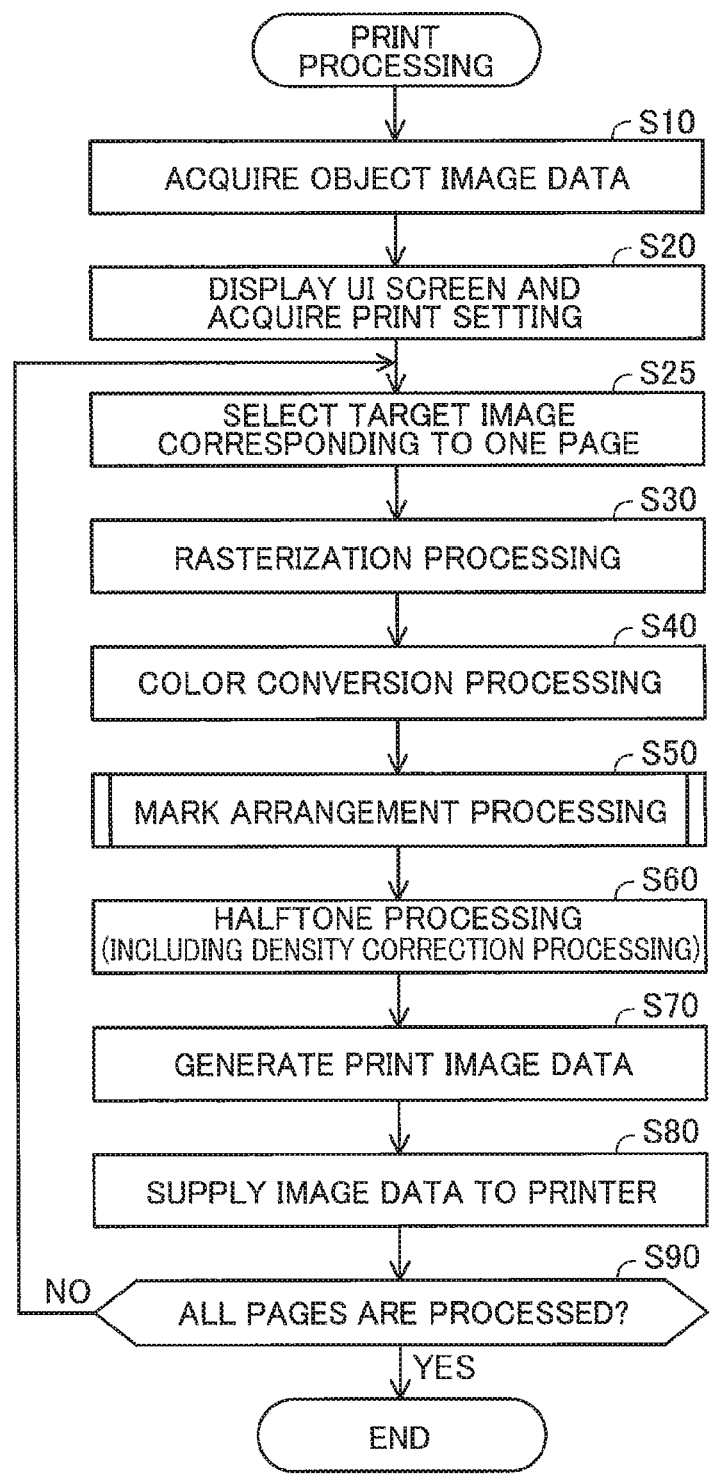
FIG. 4 is a flowchart of print processing according to the embodiment.

FIG. 4 is a flowchart of print processing. The CPU 210 of the terminal device 200 executes the print processing of FIG. 4 as a printer driver. For example, a user inputs a print instruction to an application program such as a document creation program or a drawing creation program, and the printer driver is called by the application program, whereby the print processing of FIG. 4 is started.

In S10, the CPU acquires object image data representing an object image OI to be printed. The object image data is acquired from the application program by which the printer driver is called. The object image data represents, for example, m object images OI corresponding to m pages (m is an integer equal to or larger than 1). The object image data is, for example, data that describes the object image OI using a description method provided by an operating system (OS) of the terminal device 200. For example, when the OS is Windows® manufactured by Microsoft Corp., a description method according to the specification of GDI (Graphic Device Interface) of Windows® is used. Alternatively, the object image data may be described using PCL (Printer Control Language) or page description language such as PostScript.

FIG. 3 (part B) illustrates one object image OI1 as an example of the object image OI. The object image OI1 includes a background BG and texts Ob1 and Ob2 as objects. The color of the background BG of the object image OI1 is white. Thus, when the object image OI1 is printed on the sheet S, only the texts Ob1 and Ob2 are printed (printing of the background BS is not performed).

In S20, the CPU 210 displays a user interface screen (UI screen) on the display unit 270 and acquires print settings through the UI screen.

Figure 5A:
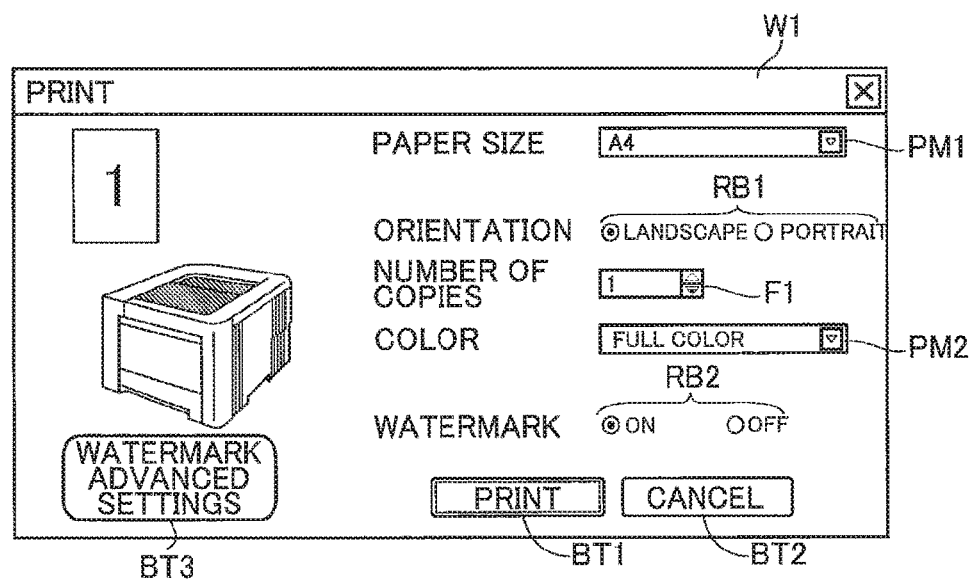
FIGS. 5A and 5B illustrate examples of a UI display according to the embodiment.
Figure 5B:
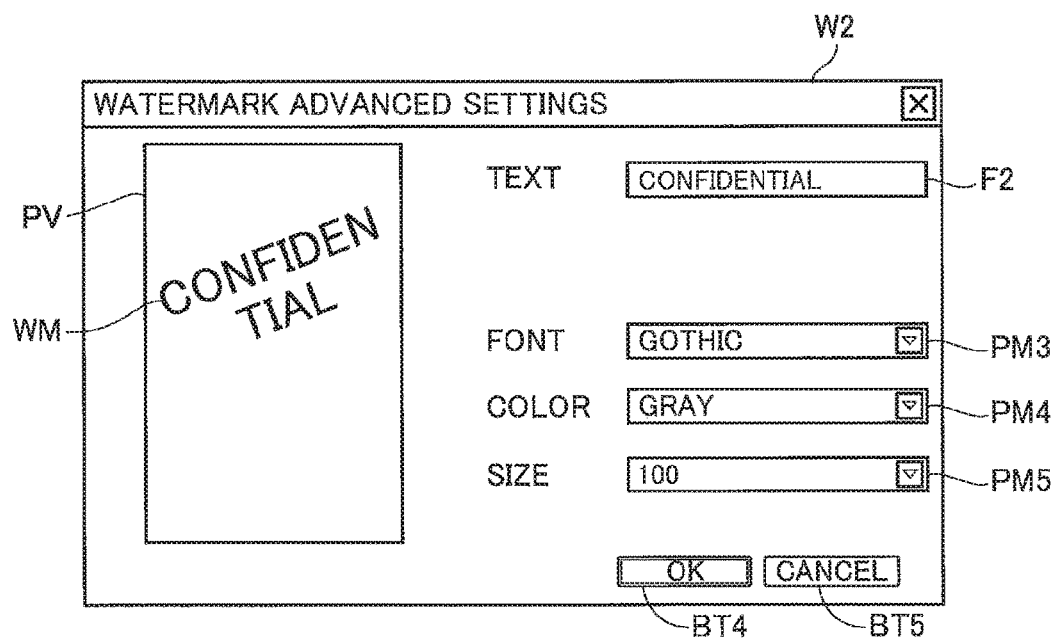

FIGS. 5A and 5B are views illustrating examples of a UI screen W1 and a UI screen W2, respectively. A main screen W1 of FIG. 5A includes pull-down menus PM1 and PM2, radio buttons RB1 and RB2, a field F1, a print button BT1, a cancel button BT2, and an advanced setting button BT3. The pull-down menus PM1 and PM2, the radio button RB1, and the field F1 are input elements for use in inputting general print settings, such as the size of the sheet S, orientation of an image with respect to the sheet S, color, and copy number. The radio button RB2 is an input element for use in inputting whether or not to perform printing of a watermark WM (to be described later). In the present embodiment, the following description will be made assuming that printing of the watermark WM is instructed through the radio button RB2.

The watermark WM is an image to be printed based on the user's instruction together with the object image OI to be printed. It can be said that the watermark WM is a kind of additional image to be added to the object image OI in an image to be printed. The watermark WM is, e.g., a faint-colored (gray-colored, etc.) character or pattern to be added to the object image OI and is also referred to as "transparent image" or "background image". In FIG. 3 (part B), an example of such a watermark WM superimposed on the object image OI1 is illustrated. The watermark WM is added to indicate a kind of information (confidential information, etc.) or to prevent unauthorized copy.

When the advanced setting button BT3 on the main screen W1 of FIG. 5A is depressed, the CPU 210 displays the advanced setting screen W2 of FIG. 5B on the display unit 270 while continuing displaying the main screen W1 of FIG. 5A. The advanced setting screen W2 includes pull-down menus PM3 to PM5, a field F2, buttons BT4 and BT5, and a preview screen PV for the watermark WM. The pull-down menus PM3 to PM5 and the field F2 are input elements for use in inputting settings concerning the watermark WM to be printed. For example, the field F2 is an input element for use in inputting a text as the watermark WM. The pull-down menus PM3 to PM5 are input elements for use in inputting font, color, and size of the watermark WM as the text, respectively. On the preview screen PV, a watermark WM based on information currently inputted to the input elements PM3 to PM5 and the field F2 is displayed. The user can move the watermark WM on the preview screen PV by operating a pointing device such as a mouse and can thereby input an instruction to specify a reference position of the watermark WM on an image to be printed.

When an OK button BT4 on the advanced setting screen W2 is depressed, the CPU 210 enables the settings input through the advanced setting screen W2 and then closes the advanced setting screen W2. When the cancel button BT5 on the advanced setting screen W2 is depressed, the CPU 210 disables the settings input through the advanced setting screen W2 and then closes the advanced setting screen W2.

The user inputs required settings on the UI screens W1 and W2 and depresses the print button BT1. Upon depression of the print button BT1, the CPU 210 acquires print settings inputted to the UI screens W1 and W2 at that time point and advances the processing to S25. When the cancel button BT2 is depressed, the CPU 210 suspends the print processing.

In S25, a target image corresponding to one page is selected from among object images OI corresponding to m pages. In S30, among the object image data, the CPU 210 rasterizes target image data representing the target image. The rasterization processing is processing of converting image data of a format different from BMP into BMP data. The BMP data in the present embodiment is, e.g., RGB image data representing color of each pixel as an RGB value. When the object image data is the RGB image data, the rasterization processing is omitted.

In S40, the CPU 210 executes color conversion processing for the rasterized target image data. The color conversion processing is processing of converting image data representing a color of each pixel by a first color system (RGB color system, in the present embodiment) to image data representing a color of each pixel by a second color system. Here, the first color system does not correspond any ink used in printing; the second color system (CMYK color system, in the present embodiment) corresponds to one or more inks used in printing. The color conversion processing is executed using a known color profile (e.g., a lookup table) defining the correspondence relationship between the RGB value and the CMYK value.

In S50, the CPU 210 executes mark arrangement processing using the color-converted target image data. The mark arrangement processing is processing for generating arrangement image data representing an arrangement image AI including the target image (one object image OI) and the watermark WM by arranging the watermark WM with respect to the target image. In FIG. 3 (part C), an example of an arrangement image AI1 including the object image OI1 and watermark WM is illustrated. Details of the mark arrangement processing will be described later. The arrangement image data generated through the mark arrangement processing is CMYK image data representing a color of each pixel as a CMYK value.

In S60, the CPU 210 executes halftone processing for the arrangement image data to generate dot data. The dot data is data representing a dot formation state (presence/absence of a dot in the present embodiment) for each pixel. In the present embodiment, the halftone processing includes density correction processing.

In the present embodiment, for the halftone processing, the non-volatile storage device 220 previously stores density data determined for each of the plurality of nozzles NZ of the print head 110. The density data for one nozzle represents the density of an image to be formed by that nozzle and is generated by measuring the density of a patch image formed by using only that nozzle.

In the halftone processing of the present embodiment, processing based on an error diffusion method is executed while the density correction processing using the density data is performed. Specifically, in the error diffusion method, when it is determined that a dot is formed for a target pixel, a value (V−DV) obtained by subtracting a density value DV from a value V of the target pixel is calculated as an error ΔE, where the density value DV represents the density of the dot determined to be formed. The error ΔE is diffused to unprocessed pixels around the target pixel. In the halftone processing not including the density correction processing, the density value DV is determined to a fixed value (e.g., 255) independently of the nozzle NZ corresponding to the target pixel. In the present embodiment, the density value VD is determined, based on the density data of the nozzle NZ corresponding to the target pixel, to a different value for each nozzle NZ. When, for example, a dot is formed at the position corresponding to the target pixel in the printing processing, the nozzle NZ corresponding to the target pixel includes a nozzle NZ used to form the dot. When dots are formed in pixels around the target pixel, the nozzle NZ corresponding to the target pixel may include nozzles NZ used to form the dots. Such density correction processing can suppress density unevenness caused in the image to be printed due to the characteristics of the nozzle NZ. Alternatively, the density correction processing may be achieved by correcting the value V of the target pixel based on the density data of the nozzle NZ corresponding to the target pixel and then by performing the error diffusion processing using a value SV of the corrected target pixel. The details of the above density correction processing are disclosed in, e.g., JP 2013-63538A.

In order to perform the above density correction processing, the correspondence relationship between each pixel of the object image OI and the nozzle NZ, i.e., the head positions P with respect to the object image OI need to be previously determined before the halftone processing of S60. In the present embodiment, the head positions P with respect to the object image OI are determined in the mark arrangement processing of S50 to be described later.

In one modification, the density correction processing does not have to be performed in the halftone processing. In this case, the head positions P with respect to the object image OI need not be determined before the halftone processing of S60. Therefore, in this case, the mark arrangement processing may be executed using the dot data after the halftone processing.

In S70, the CPU 210 adds various print commands to the dot data to generate print image data. In S80, the CPU 210 supplies the print image data to the printer 10. The printer 10 prints the arrangement image AI including the target image and the watermark WM to the sheet S according to the supplied print image data.

In S90, the CPU 210 determines whether or not all the pages are processed. When there is any unprocessed page (NO in S90), the CPU 210 returns the processing to S25. When processing of all the pages is completed (YES in S90), the CPU 210 ends the print processing.

As a result, the watermark WM is added to each of m object images corresponding to m pages represented by the object image data, and each of m object images is printed on the sheet S.

Figure 6:
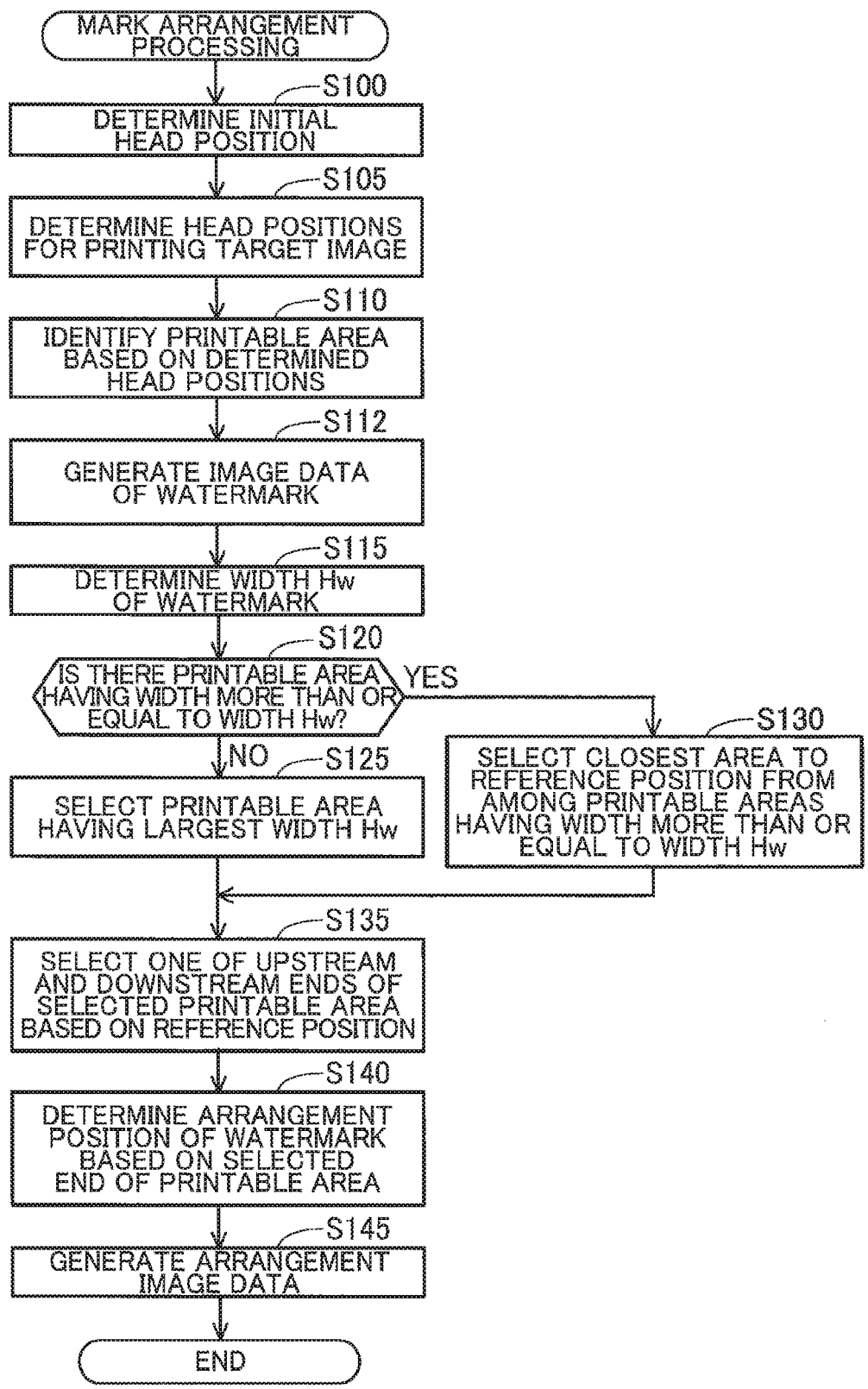
FIG. 6 is a flowchart of mark arrangement processing according to the embodiment.

FIG. 6 is a flowchart of the mark arrangement processing. In S100, a head position P1 of the first partial printing operation SP1 is determined.

A-3. Mark Arrangement Processing

Specifically, the CPU 210 determines the arrangement position of the target image with respect to the sheet S. Hereinafter, it is assumed that the object image OI1 of FIG. 3 (part B) is set as the target image. The position of the object image OI1 with respect to the sheet S is, for example, a position specified by an application program or a position specified by a printer driver.

The CPU 210 uses the object image data to identify the downstream end (+Y side end) of a print target in the object image OI1. The print target means a part of the object image OI1 that is represented by ink dots in a printed state. A part including the downstream end of the print target is a part to be printed at first. When the background BG of the object image OI1 has a color different from white, the downstream end of the background BG is identified as the downstream end of the print target. With regard to the example of FIG. 3 (part B) in which the color of the background BG is white, the downstream end of the text Ob1 is identified as the downstream end of the print target, because the text Ob1 is positioned at the most downstream among the texts Ob1 and Ob2 which are objects having a color different from white. The dashed line L1 in FIGS. 3A to 3C indicates the position (position on the Y-axis) of the downstream end of the print target of the object image OI1 in the conveying direction AR.

The CPU 210 determines the head position P at which the position of the identified downstream end of the print target in the conveying direction AR and the positions of specific nozzles NZx in the conveying direction AR coincide with each other as the head position P1 of the first partial printing operation SP1. The specific nozzles NZx are, of the plurality of nozzles NZ of the print head 110, the nozzles positioned at (¼) of the nozzle length D from the most upstream side nozzle NZu (FIG. 3, part A). By determining the head position P1 based on the object image OI as described above, the part of including the downstream end of the print target can be printed by using as many nozzles as possible, thereby enhancing printing efficiency.

In S105, the CPU 210 determines all head positions to be used for printing the target image based on the determined head position P1. The to-be-used head positions are head positions set for a plurality of partial printing operations SP to be executed for printing the target image. It is assumed here that the object image OI1 of FIG. 3 (part B) is set as the target image. First, the CPU 210 determines head positions P2 to P14 for respective 2 nd to 14th partial printing operations SP2 to SP14 based on the determined head position P1.

The reason that all the to-be-used head positions are determined is because, as described above, the correspondence relationship between each pixel of the object image OI and the nozzle NZ should be determined before the halftone processing. Specifically, the head positions with respect to the object image OI need to be determined before the halftone processing of S60 since the density correction processing is performed in the halftone processing of S60. In detail, a k-th (k is an integer equal to or larger than 2 and equal or smaller than 14) head position Pk is determined to a position shifted to the upstream side (−Y side) from a (k-1)-th head position P(k-1) by (¼)D. Then, the CPU 210 uses the object image data to select the to-be-used head positions from the determined head positions P1 to P14 for the 1 st to 14 th partial printing operations SP1 to SP14. In the object image OI1 of FIG. 3 (part B), the background BG is not printed, and only the texts Ob1 and Ob2 are printed. Thus, as illustrated in FIGS. 3A and 3B, the head positions P1 to P4 and P8 to P12 that overlap at least partially the texts Ob1 and Ob2 as the print targets in the conveying direction AR are selected as the to-be-used head positions. The head positions P5 to P7, P13, and P14 that do not overlap the texts Ob1 and Ob2 as the print targets in the conveying direction AR are not selected as the to-be-used head positions. Nine head positions P1 to P4, and P8 to P12 thus selected are determined as the to-be-used head positions.

Determination of the to-be-used head positions with respect to the object image OI1 is equivalent to selection of nozzles to be used for forming a plurality of dots expressing the object image OI1 from the plurality of nozzles NZ of the print head 110.

In S110, the CPU 210 identifies one or more printable areas AA based on the plurality of determined to-be-used head positions. One printable area AA is an area that can be printed by a plurality of partial printing operations SP performed at the plurality of determined to-be-used head positions and is continuous in the conveying direction AR. When the object image OI1 of FIG. 3 (part B) is the target image, a first printable area AA1 that can be printed at the head positions P1 to P4 and a second printable area AA2 that can be printed at the head positions P8 to P12 are identified. Lengths (hereinafter, referred to merely as "widths") H1 and H2 of the first and second printable area AA1 and AA2 in the conveying direction AR are larger than widths h1 and h2 of the corresponding texts Ob1 and Ob2 in the conveying direction AR, respectively.

In S112, the CPU 210 generates image data representing the watermark WM. Specifically, the CPU 210 generates image data representing the watermark WM based on settings concerning the watermark WM acquired through the advanced setting screen W2 of FIG. 5B. For example, image data representing a watermark "CONFIDENTIAL" illustrated in FIG. 3 (part B) is generated.

In S115, the CPU 210 identifies a width Hw of the watermark WM in the conveying direction AR based on the generated image data (FIG. 3, part B).

In S120, the CPU 210 determines whether or not there is any printable area AA that has a width equal to or larger than that of the watermark WM. In the example of FIG. 3 (part B), both the widths H1 and H2 of the printable areas AA1 and AA2 are smaller than the width Hw of the watermark WM. Accordingly, in this case, it is determined that there is no printable area AA that has a width equal to or larger than that of the watermark WM.

When it is determined that there is any printable area AA that has a width equal to or larger than that of the watermark WM (YES in S120), the CPU 210 selects, in S130, from among one or more printable areas AA that have a width equal to or larger than that of the watermark WM, one printable area AA that is positioned closest to a reference position of the watermark WM in the conveying direction. The reference position of the watermark WM is designated by a user through the above advanced setting screen W2 (FIG. 5B). Alternatively, the reference position may be previously determined and may be arranged so that the centroid position of the object image OI1 and that of the watermark WM coincide with each other. It is assumed in FIG. 3 (part B) that the watermark WM is disposed at the reference position with respect to the object image OI1.

When it is determined that there is no printable area AA that has a width equal to or larger than that of the watermark WM (NO in S120), the CPU 210 selects, in S125, one printable area AA having the largest width from among one or more printable areas AA. In the example of FIG. 3 (part B), the second printable area AA2 having a larger width is selected from among the printable areas AA1 and AA2.

In S135, the CPU 210 selects any one of the upstream end and downstream end of the selected printable area AA based on the reference position of the watermark WM. Specifically, a case where the watermark WM is disposed with respect to the object image OI1 such that the upstream end of the watermark WM and the upstream end of the selected printable area AA coincide with each other in the conveying direction AR is set as a first case. A case where the watermark WM is disposed with respect to the object image OI1 such that the downstream end of the watermark WM and the downstream end of the selected printable area AA coincide with each other in the conveying direction AR is set as a second case. One of the above first and second cases that is smaller in moving distance from the reference position of the watermark WM is adopted. When the first case is adopted, the upstream end of the printable area AA is selected, while when the second case is adopted, the downstream of the printable area AA is selected. When the watermark WM as illustrated in FIG. 3 (part B) is disposed at the reference position, the moving distance from the reference position of the watermark WM is smaller in the first case where the upstream end of the watermark WM and the upstream end of the second printable area AA2 than in the second case. Accordingly, in FIG. 3 (part B), the upstream end of the second printable area AA2 is selected. Further, in this step, in addition to the consideration of the moving distance as mentioned above, any one of the upstream end and downstream end of the selected printable area AA is selected on condition that a part of the watermark WM does not run off the printing area on the sheet S.

In S140, the CPU 210 determines the arrangement position of the watermark WM with respect to the object image OI1 with reference to the selected end of the selected printable area AA. For example, in the example of FIG. 3 (part B), the second printable area AA2 is selected in S130 and the upstream end of the second printable area AA2 is selected in S135. The arrangement position of the watermark WM is then determined such that the upstream end of the second printable area AA2 and the upstream end of the watermark WM coincide with each other in the conveying direction AR.

In S145, the CPU 210 arranges the watermark WM at the determined arrangement position with respect to the object image OI1 to thereby generate arrangement image data representing an arrangement image AI1. As a result, in the arrangement image AI1, the position of the watermark WM is adjusted from the reference position as illustrated in FIG. 3 (part C).

FIGS. 7A to 7C are the second drawing illustrating the relationship between the object image OI1, watermark WM, and head positions P. For better understanding, the mark arrangement processing will be described with an object image OI2 different from the object image OI1 of FIG. 3 (part B) taken as an example.

Figure 7:
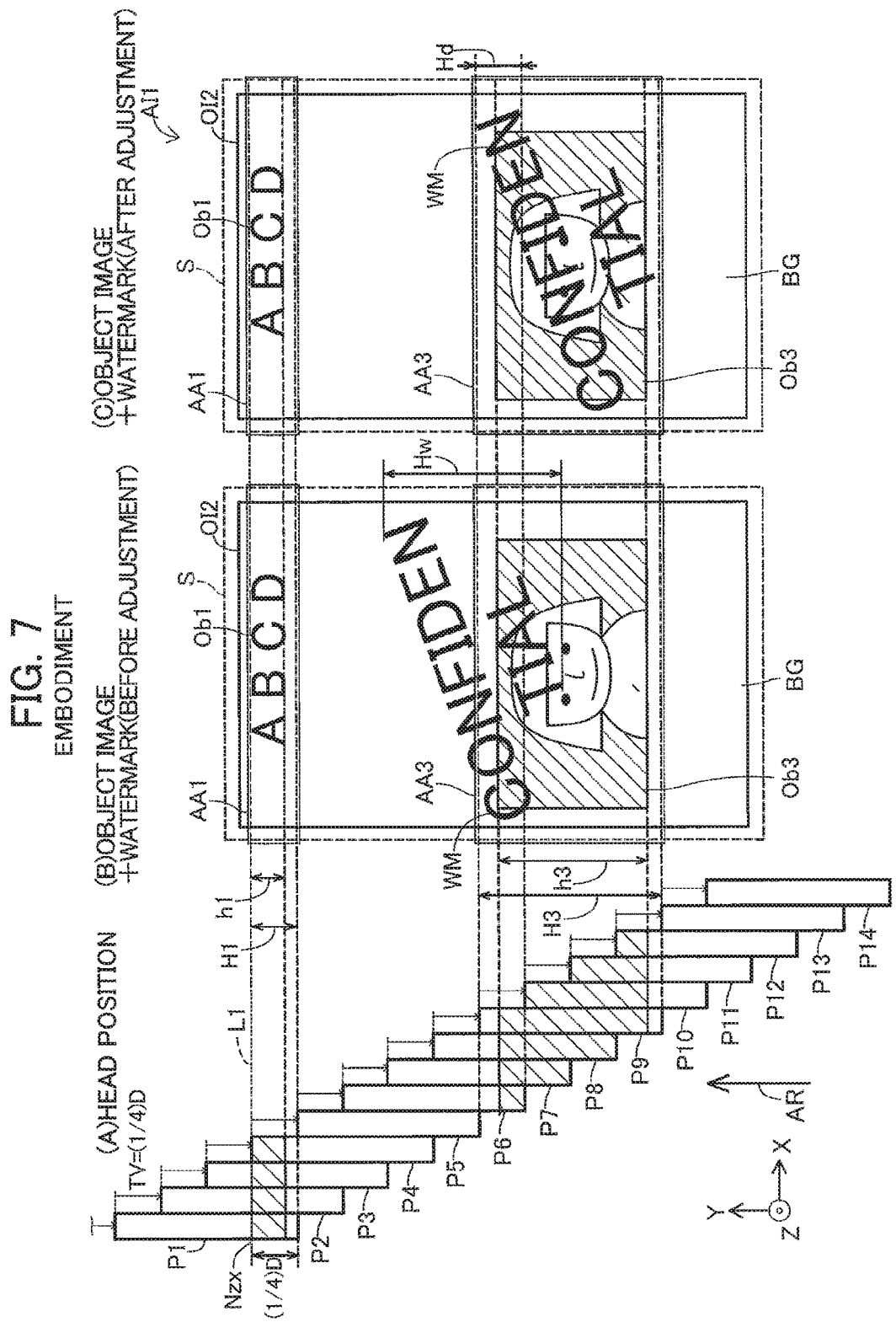
FIG. 7 is a second drawing illustrating the relationship between the target image, the watermark, and the head position according to the embodiment.

The head positions P1 to P14 in part A of FIG. 7 are the same as those in FIG. 3 (part A). The object image OI2 of FIG. 7 (part B) includes a drawing Ob3 in place of the text Ob2 of the object image OI1. When the target image is the object image OI2, head positions P1 to P4 for printing the text Ob1 and head positions P16 to P12 for printing the drawing Ob3 are determined as the to-be-used head positions in S105 (FIG. 7, part A). Then, in S110, the printable area AA1 that can be printed at the head positions P1 to P4 and a third printable area AA3 that can be printed at the head positions P6 to P12 are identified (FIG. 7, part B).

In the example of FIG. 7 (part B), the width H1 of the first printable area AA1 is smaller than the width Hw of the watermark WM, while a width H3 of the third printable area AA3 is larger than the width Hw of the watermark WM. Accordingly, in S120, it is determined that there is any printable area AA that has a width equal to or larger than the width of the watermark WM. Then, in step S130, the third printable area AA3 that has a width equal to or larger than that of the watermark WM is selected.

In the example of FIG. 7 (part B), the moving distance from the reference position of the watermark WM is smaller when the downstream end of the watermark WM and the downstream end of the third printable area AA3 are made to coincide with each other than when the upstream end of the watermark WM and the upstream end of the third printable area AA3 are made to coincide with each other. Accordingly, in the example of FIG. 7 (part B), the downstream end of the third printable area AA3 is selected in S135. Then, in S140, the arrangement position of the watermark WM is determined such that the downstream end of the third printable area AA3 and the downstream end of the watermark WM coincide with each other in the conveying direction AR. As a result, in S145, as illustrated in FIG. 7 (part C), the arrangement image AI2 having the adjusted position of the watermark WM adjusted from the reference position is generated.

According to the embodiment described above, in the mark arrangement processing of FIG. 6, a plurality of head positions P for a plurality of partial printing operations SP to print the object image OI (for example, the object image OI1 of FIG. 3 (part B) or the object image OI2 of FIG. 7, part B) are determined (S100, S105). Then, based on the plurality of head positions P, the relative position of the watermark WM with respect to the object image OI is determined (S115 to S140). At this time, when the number of times of partial printing operation SP needs to be increased for printing the watermark WM with respect to the plurality of partial printing operations SP for the object image OI, the position of the watermark WM is determined such that the additional number of partial printing operations SP can be the smallest. As a result, a time required for printing the arrangement image AI including the object image OI and watermark WM can be prevented from increasing.

A detailed description will be given of this point. For example, as illustrated in FIG. 3 (part B), it is assumed that printing is performed with the watermark WM disposed at the reference position. In this case, the downstream end (+Y side end) of the watermark WM is positioned further downstream than the upstream end (dashed line L2 of FIG. 3, part B) of the head position P3 for the partial printing operation SP3. Accordingly, in this case, for printing the watermark WM, five partial printing operations SP3 to SP7 corresponding to the head positions P3 to P7 need to be added to the partial printing operations SP8 to SP12 corresponding to the head positions P8 to P12 for printing the text Ob2.

Figure 8:
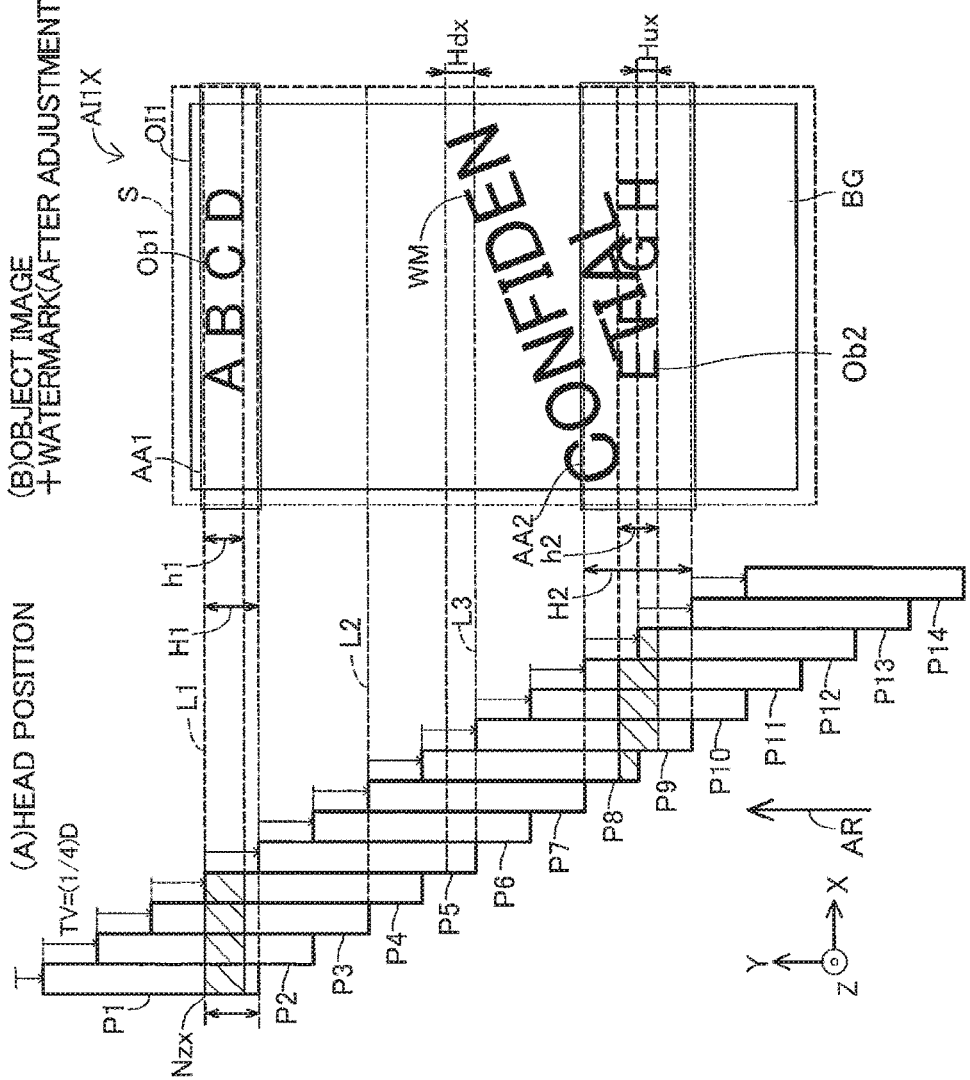
FIG. 8 illustrates an arrangement image according to a comparison example.

A comparison example will be described. FIGS. 8A and 8B are a view illustrating an arrangement image AI1X of a comparison example In this arrangement image AI1X, the watermark WM is disposed such that the upstream end (−Y side end) of the text Ob2 and the upstream end of the watermark WM coincide with each other in the conveying direction AR. In this example, the downstream end (+Y side end) of the watermark WM is positioned further downstream than the upstream end (dashed line L3 of FIG. 8, part B) of the head position P5 for the partial printing operation SP5. Accordingly, in this case, for printing the watermark WM in the arrangement image AI1X, three partial printing operations SP5 to SP7 corresponding to the head positions P5 to P7 need to be added to the partial printing operations SP8 to SP12.

On the other hand, in the present embodiment, one or more printable areas AA that can be printed by the plurality of partial printing operations SP for printing the object image OI are identified (S110) and, based on the identified printable areas AA, the relative position of the watermark WM is then determined (S120 to S140). More specifically, the relative position of the watermark WM is determined such that one of the upstream and downstream ends of a specific area selected from the one or more printable areas AA coincides with a corresponding one of the upstream and downstream ends of the watermark WM in the conveying direction AR (S135, S140). As described above, in the example of FIG. 3 (part C), the relative position of the watermark WM is determined such that the upstream end of the second printable area AA2 coincides with the upstream end of the watermark WM in the conveying direction AR. As a result, in the example of FIG. 3 (part C), the downstream end of the watermark WM is positioned upstream of the upstream end (dashed line L3 of FIG. 3, part C) of the head position P5 for the partial printing operation SP5. Accordingly, in the arrangement image AI1 of the present embodiment, only two partial printing operations SP6 and SP7 corresponding to the head positions P6 and P7 need to be added for printing the watermark WM. Thus, unlike the example of FIG. 3 (part B) and the comparative example, the number of the partial printing operations to be added can be minimized Thus, a time required for printing the arrangement image AI can be prevented from increasing as compared to a case where an arrangement image including the watermark WM is printed irrespective of the position or size of the object image OI.

More specifically, in the present embodiment, the relative position of the watermark WM is determined such that the upstream end of the second printable area AA2 and the upstream end of the watermark WM coincide with each other in the conveying direction AR, as described above. As a result, a width Hu (FIG. 3 ,part C) of a part of the watermark WM that is printed by the last partial printing operation SP12 for the watermark WM, i.e., by the partial printing operation SP12 corresponding to the head position P12 is (¼)D. Thus, the number of partial printing operations SP to be added can be minimized For example, in the comparison example of FIG. 8 (part B), a width Hux (FIG. 8, part B) of a part of the watermark WM printed by the last partial printing operation SP12 for the watermark WM is less than (¼)D. Further, a width Hdx (FIG. 8, part B) of a part of the watermark WM printed by the first partial printing operation SP5 for the watermark WM is also less than (¼)D. This may increase a possibility that the number of partial printing operations SP to be added cannot be minimized In general, the reference value (¼)D corresponds to (1/M) of the nozzle length D, where M-pass printing (M=4, in the present embodiment) with uniform feeding is performed.

As in the example of FIG. 7 (part C), the relative position of the watermark WM may be determined such that the downstream end of the third printable area AA3 and the downstream end of the watermark WM coincide with each other in the conveying direction AR. In this case, a width Hd of a part of the watermark WM printed by the first partial printing operation SP6 for the watermark WM, i.e., by the partial printing operation SP6 corresponding to the head position P6 is (¼)D. Even in this case, the number of partial printing operations SP to be added can be minimized In general, the relative position of the watermark WM may be determined such that the width of a part of the watermark WM that is printed by at least one of the first and last partial printing operations SP for the watermark WM is equal to or larger than the reference value (e.g., (¼)D).

Further, in the above embodiment, when the width of the watermark WM is larger than the width of a specific area selected from among one or more printable areas AA, the relative position of the watermark WM is determined such that the area that can be printed by a plurality of partial printing operations for the watermark WM includes the specific area. For example, in the example of FIG. 3 (part C), the width Hw of the watermark WM is larger than a width H2 of the second printable area AA2, and the plurality of partial printing operations SP6 to SP12 for the watermark WM includes the partial printing operations SP8 to SP12 for the text Ob2. Thus, the area that can be printed by the plurality of partial printing operations SP6 to SP12 for the watermark WM includes the second printable area AA2. Thus, when the width Hw of the watermark WM is larger than the width of the specific area, the relative position of the watermark WM can be determined adequately.

In the above embodiment, when the width of the watermark WM is smaller than the width of a specific area selected from among one or more printable areas AA, the relative position of the watermark WM is determined such that the area that can be printed by a plurality of partial printing operations for the watermark WM is included in the specific area. For example, in the example of FIG. 7 (part C), the width Hw of the watermark WM is smaller than the width H3 of the third printable area AA3, and the plurality of partial printing operations SP6 to SP12 for the watermark WM are included in the partial printing operations SP6 to SP12 for the drawing Ob3. Thus, it can be understood that the area that can be printed by the plurality of partial printing operations SP6 to SP12 for the watermark WM is included in the third printable area AA3. Thus, when the width Hw of the watermark WM is smaller than the width of the specific area, the relative position of the watermark WM can be determined adequately.

In the above embodiment, the widths H1, H2, Hw, which corresponds to the printable areas AA1, AA2 and the watermark WM respectively, are identified. In addition, the identified widths H1, H2, Hw are used to determine the relative position of the watermark WM (S120 to S140). Thus, the relative position of the watermark WM can be determined adequately. For example, when there is a printable area AA having a width larger than the width Hw of the watermark WM, the watermark WM is positioned or disposed within the printable area AA (S130), so that when this eliminates the need to add the partial printing operation SP12, an increase in the number of partial printing operations SP12 to be added can be suppressed. Otherwise, when there is no printable area AA having a width larger than the width Hw of the watermark WM, the watermark WM is disposed so as to overlap the printable area AA having the maximum width (S125). Accordingly, the number of additional partial printing operations SP can be minimized Further, in the above embodiment, the head positions P for the plurality of partial printing operations SP for the object image OI are determined based on the downstream end of the object image OI (S100, S105). As a result, the head positions can be determined adequately so as to suppress an increase in the number of partial printing operations for the object image OI.

Further, in the above embodiment, the head positions are determined in the mark arrangement processing of S50 by using the object image data having been converted through the color conversion processing of S40 of FIG. 4. As a result, the head positions can be determined at an adequate timing. For example, in the present embodiment, when the density correction processing is performed in the halftone processing of S60, the head positions need to be determined before S60. Even in this case, the head positions can be determined without problem. Alternatively, the mark arrangement processing may be executed after the rasterization processing and before the color conversion processing by using the object image data which is RGB image data.

Further, in the above embodiment, the relative position of the watermark WM is determined based on the head positions with respect to the object image OI and the reference position of the watermark WM (S135, S140). As a result, the relative position of the watermark WM can be determined adequately by using the reference position. For example, the reference position is determined based on an instruction acquired from a user through the display unit 270. Thus, the relative position of the watermark WM can properly be determined to a position according to the user's intention.

Further, in the above embodiment, it can be seen from S25 and S90 of FIG. 4, when the object image data represents a plurality of object images corresponding to a plurality of pages, the head positions P with respect to the object image OI are determined for each page and, based on the head positions P determined for each page, the relative position of the watermark WM is determined for each page. Thus, a time required for printing the arrangement images AI corresponding to a plurality of pages can be reduced in a proper way.

B: Modification (1) In FIGS. 9A to 9C, an additional image to be added to the object image OI is the watermark WM, but not limited thereto. FIGS. 9A to 9C illustrate a first modification. In this modification, a tag TG is added to the object image OI of FIG. 3 (part B) as the additional image in place of the watermark WM. The tag TG is added to a position along one side end (+X side end) in the main scan direction of the sheet S. Thus, even when one or more sheets are placed on a specific sheet S, the user can recognize the tag TG printed on the specific sheet S. For example, the tag TG is an image having a rectangular shape and filled with a solid color. For example, image data representing the tag TG is data including a color value representing the color of the tag TG and information indicating the rectangular size of the tag TG.

The tag TG is added for a user to efficiently classify a plurality of printed sheets. For example, when images corresponding to M (M is an integer equal to or larger than 2) pages per one set are printed by N (N is an integer equal to or larger than 2) sets, that is, images corresponding to (M×N) pages are printed, the tag TG is added as an image representing the first page of each N set. This facilitates classification of the (M×N) sheets into a plurality of sets. When the number M of pages per set is comparatively small, the tag TG may be added such that the color or position thereof is different for each set. Further, the tag TG may be added only when the number M of pages per set is comparatively large, and therefore, a load of the classification work is relatively high. Further, the tag TG may be added such that the color or position thereof is different for each print job, for each user instructing the print job, or for each terminal (e.g., terminal device 200) transmitting the print job. This facilitates classification of a plurality of sheets based on print job, user, or terminal.

Figure 9:
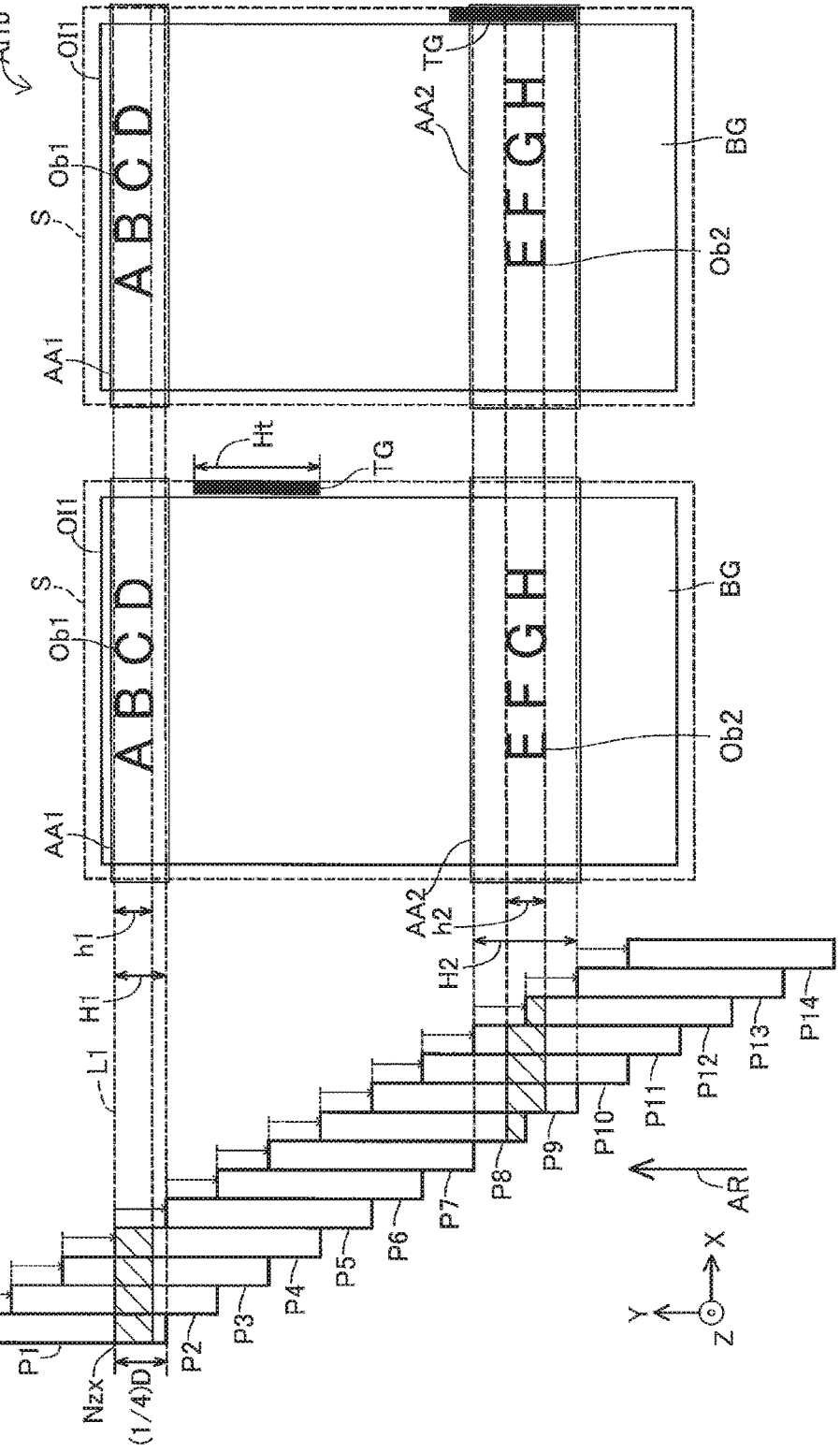
FIG. 9 is a first explanatory drawing illustrating a relationship between a target image, a watermark, and a head position according to a modification.

For example, when the tag TG is added to the reference position as illustrated in FIG. 9 (part B), the number of partial printing operations SP to be added for printing the tag TG may excessively increase. In the example of FIG. 9 (part B), a width Ht of the tag TG is larger than the widths H1 and H2 of the respective printable areas AA1 and AA2. According to the present embodiment, as illustrated in FIG. 9 (part C), the relative position of the tag TG is determined such that the upstream end of the second printable area AA2 which is the printable area AA having the maximum width coincides with the upstream end of the tag TG in the conveying direction AR. As a result, a time required for printing an arrangement image AI1b including the object image OI1 and the tag TG can be prevented from increasing.

The additional image may be a trace pattern, which is a specific pattern for tracing a device that prints securities such as bills or stamps.

(2) In the above embodiment, the head positions are determined with respect to the object image OI and, based on the determined head positions, the relative position of the additional image with respect to the object image OI is determined. Alternatively, another method may be adopted. For example, when two images PI1 and PI2 corresponding to two pages are printed on one sheet S, the head positions are determined with respect to the image PI1 of the first page, and the relative position of the image PI2 of the second page may be determined based on the determined head positions.

Figure 10:
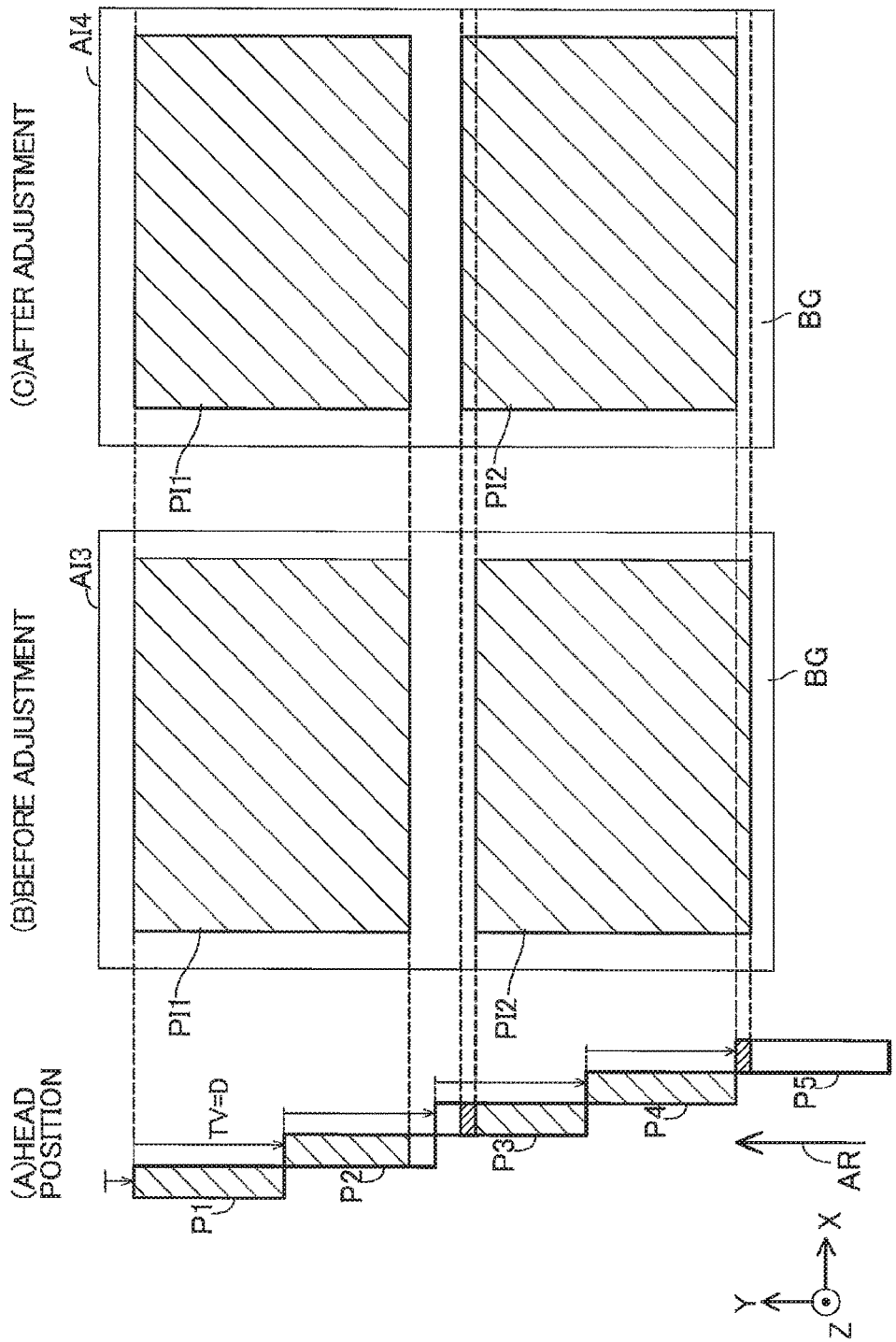
FIG. 10 is a second explanatory drawing illustrating the relationship between the target image, the watermark, and the head position according to the modification.

FIGS. 10A to 10C illustrate a second modification. In this example, so-called 1-pass printing in which one area is printed by one partial printing operation SP is performed. The head positions P1 to P5 of FIG. 10 (part A) are determined based on the image PI1 of the first page such that the downstream end of the image PI1 and the downstream end of the head position P1 for the first partial printing operation SP1 coincide with each other in the conveying direction AR.

In this case, as in an arrangement image AI3 of FIG. 10 (part B), when the image PI2 of the second page is positioned at a predetermined reference position, three partial printing operations SP3 to SP5 corresponding to the head positions P3 to P5 need to be added for printing the image PI2 of the second page. In the present modification, as in an arrangement image AI4 of FIG. 10 (part C), based on the head positions P1 to P5 determined by the image PI1 of the first page, the relative position of the image PI2 of the second page is determined based on the image PI1 of the first page. Accordingly, the upstream end (−Y side end) of the printable area corresponding to the head position P4 and the upstream end of the image PI2 of the second page coincide with each other in the conveying direction AR. As a result, only two partial printing operations SP3 and SP4 corresponding to the head positions P3 and P4 need to be added for printing the image PI2 of the second page.

In general, the head positions are determined by referring a first image and, based on the determined head positions, the relative position of a second image with respect to the first image is determined. In this case, the first and second images may be images allowed to overlap each other in the conveying direction AR like the object image OI1 and the watermark WM in the above embodiment. Alternatively, the first and second images may be images that are not allowed to overlap each other in the conveying direction AR like the images PI1 and PI2 corresponding to two pages of the present modification. The image that is not allowed to overlap the object image in the conveying direction AR includes, e.g., the header or footer.

(3) In the above embodiment, the relative position of the watermark WM is determined such that one of the upstream and downstream ends of the printable area AA having the maximum width and the corresponding end of the watermark WM coincide with each other in the conveying direction AR. The CPU 210 identifies the number of partial printing operations SP to be added in a state where one of the upstream and downstream ends of the printable area AA having the maximum width and the corresponding end of the watermark WM coincide with each other in the conveying direction AR. In this case, the position of the watermark WM in the conveying direction AR may be adjusted within the range that the number of partial printing operations SP to be added does not increase from the minimum value. For example, there may be a case where the watermark WM makes an object in the object image OI1 hard to see. In such a case, the position of the watermark WM in the conveying direction AR may be adjusted so as to reduce the overlap between the watermark WM and the object in the object image OI1.

(4) In the above embodiment, the relative position of the watermark WM is determined based on the reference position. However, the relative position of the watermark WM may be determined without use of the reference position. In this case, the relative position of the watermark WM may be determined simply such that, for example, the upstream end of the printable area AA having the maximum width and the upstream end of the watermark WM coincide with each other in the conveying direction AR.

(5) When the number of printable areas AA is one, identification of the width of the printable area AA or the width of the watermark WM may be omitted. In this case, the relative position of the watermark WM may be determined simply such that, for example, the upstream end of the one printable area AA and the upstream end of the watermark WM coincide with each other in the conveying direction AR.

(6) In the above embodiment, the head positions P of the entire object image OI1 are determined with reference to the downstream end of the print target in the object image OI1, i.e., the downstream end of the text Ob1 (S100, S105). However, the head positions P may be determined with reference to a plurality of different positions with respect to a plurality of objects which are disposed spaced apart from each other at a predetermined distance in the conveying direction AR within the object image OI1. That is, for example, the head positions P for printing the text Ob1 may be determined with reference to the downstream end of the text Ob1, or the head positions P for printing the text Ob2 may be determined with reference to the downstream end of the text Ob2.

(7) Standard head positions for printing the entire sheet S, i.e., 14 head positions P1 to P14 of FIG. 3 (part A) may be previously determined independently of the object image OI1. In this case, the CPU 210 selects, from among the previously determined 14 head positions P1 to P14, the to-be-used head positions based on the texts Ob1 and Ob2 to determine the to-be-used head positions with respect to the object image OI1.

(8) The terminal device 200 as the control device that executes the print processing of FIG. 4 may be a device of a type different from a personal computer such as the printer 10, a digital camera, a scanner, or a smartphone. When the printer 10 executes the print processing of FIG. 4, the control unit 15 of the printer 10 executes the print processing of FIG. 4 to make the printing mechanism 100 of the printer 10 print the arrangement image AI. Further, the control device that executes the print processing of FIG. 4 may be a server that can communicate with the terminal device 200 or printer 10 over the Internet. In this case, the server acquires the object image data from the terminal device 200 or printer 10, executes the print processing of FIG. 4, and supplies generated print data to the terminal device 200 or printer 10. The server may be a plurality of computers that can communicate with each other over a network. In this case, the plurality of computers correspond to the control device.

A part of the configuration realized by hardware in the embodiments may be replaced by software, or on the contrary, a part of the configuration realized by software in the embodiments may be replaced by hardware. For example, a part of the processing executed by the CPU 210 of the terminal device 200 of FIG. 1 may be realized by a dedicated hardware circuit.

While the description has been made in detail with reference to specific embodiment(s) thereof, it would be apparent to those skilled in the art that various changes and modifications may be made therein without departing from the spirit and scope of the above described embodiment(s).

What is claimed is:

1. A control device for controlling a printer,
wherein the printer is configured to alternatively perform partial printing and sheet conveying, and comprises:
a conveyer configured to convey a sheet in a conveying direction in the sheet conveying; and
a print head having a plurality of nozzles each configured to eject a droplet of ink onto the sheet, the print head configured to print a part of a print image in the partial printing,
the control device comprising:
a processor including hardware; and
a memory storing computer-readable instructions therein, the computer-readable instructions, when executed by the processor, causing the control device to perform:
acquiring first image data representing a first image to be printed and second image data representing a second image to be printed with the first image data;
determining, based on the first image, a plurality of head positions of the print head relative to the first image in the conveying direction;
determining a relative position of the second image relative to the first image in the conveying direction such that, if the number of partial printings for printing the first image and the second image is increased from the number of partial printings for printing the first image, the relative position can minimize the increment;
generating, using the first image data and the second image data, arrangement image data representing an arrangement image including the first mage and the second image positioned at the relative position relative to the first image; and
supplying, to the printer, print image data based on the arrangement image data.

2. The control device according to claim 1, wherein the second image is added to the first image in accordance with a user's instruction.

3. The control device according to claim 1, wherein the second image is printed by the partial printings defining a first printing and a last printing; and
wherein, in the determining of the relative position of the second image, the control device determines the relative position such that the second image has a portion printable by one of the first partial printing and the last partial printing and the portion has a length longer or equal to a predetermined length.

4. The control device according to claim 1, wherein the control device is configured to further perform specifying at least one printable area printable by the partial printings, the printable area continuing in the conveying direction; and
wherein, in the determining of the relative position of the second image, the control device determines the relative position based on the at least one printable area.

5. The control device according to claim 4, wherein the at least one printable area has a specific area continuing in the conveying direction; and
wherein, when the second image has a length longer than that of the specific area in the conveying direction in the determining of the relative position of the second image, the control device determines the relative position such that the printable area printable by the partial printings for the second image includes the specific area.

6. The control device according to claim 4, wherein the at least one printable area has a specific area continuing in the conveying direction; and
wherein, when the second image has a length smaller than that of the specific area in the conveying direction in the determining of the relative position of the second image, the control device determines the relative position such that the printable area printable by the partial printings for the second image is included in the specific area.

7. The control device according to claim 4, wherein the second image has a length in the conveying direction and the least one printable area includes printable areas each of which has a length in the conveying direction; and
wherein, in the determining of the relative position of the second image, the control device specifies the length of each printable area and the length of the second image and determines the relative position based on the length of each printable area and the length of the second image.

8. The control device according to claim 4, wherein the second image has an upstream end portion and a downstream end portion in the conveying direction, and the specific area has an upstream end portion and a downstream end portion in the conveying direction; and
wherein, in the determining of the relative position of the second image, the control device determines the relative position such that one of the upstream end portion and the downstream end portion of the second image and corresponding one of the upstream end portion and the downstream end portion of the specific area coincide with each other.

9. The control device according to claim 1, wherein the first image has a downstream end portion having a position in the conveying direction; and
   wherein, in the determining of the plurality of head positions, the control device determines the plurality of head positions based on the position of the downstream end portion in the conveying direction.

10. The control device according to claim 1, wherein the control device is configured to further perform at least one of:
    converting the first image data in a format different from bitmap to the first image data in a bitmap format; and
    converting the first image data representing a color of each pixel by a first color system to the first image data representing a color of each pixel by a second color system, the first color system being inconsistent with any ink used in the partial printing, the second color system corresponding to one or more inks used in the partial printing; and
    wherein, in the determining of the plurality of head positions, the control device determines the plurality of head positions based on the first image data in which at least one of the format and the color system is converted.

11. The control device according to claim 1, wherein the second image defines a reference position; and
    wherein, in the determining of the relative position of the second image, the control device determines the relative position based on the plurality of head positions and the reference position.

12. The control device according to claim 11, wherein the control device is configured to further perform:
    acquiring an instruction to designate the reference position via a display; and
    determining the reference position based on the instruction.

13. The control device according to claim 1, wherein the control device is configured to perform:
    acquiring, in the acquiring, the first image data representing a plurality of first images corresponding to respective ones of a plurality of pages individually;
    determining, in the determining of the plurality of head positions, the plurality of head positions of the print head for each page; and
    determining, in the determining of the relative position of the second image, the relative position for each page based on the plurality of head positions for each corresponding page.

14. A non-transitory computer readable storage medium storing a set of program instructions installed on and executed by a computer for controlling a printer,
    wherein the printer is configured to alternatively perform a partial printing and a sheet conveying, and comprises:
    a conveyer configured to convey a sheet in a conveying direction in the sheet conveying; and
    a print head having a plurality of nozzles each configured to eject a droplet of ink onto the sheet, the print head configured to print a part of a print image in the partial printing,
    the program instructions comprising:
    acquiring first image data representing a first image to be printed and second image data representing a second image to be printed with the first image data;
    determining, based on the first image, a plurality of head positions of the print head relative to the first image in the conveying direction;
    determining a relative position of the second image relative to the first image in the conveying direction such that, if the number of partial printings for printing the first image and the second image is increased from the number of partial printings for printing the first image, the relative position can minimize the increment;
    generating, using the first image data and the second image data, arrangement image data representing an arrangement image including the first mage and the second image positioned at the relative position relative to the first image; and
    supplying, to the printer, print image data based on the arrangement image data.

15. A method for controlling a printer,
    wherein the printer is configured to alternatively perform a partial printing and a sheet conveying, and comprises:
    a conveyer configured to convey a sheet in a conveying direction in the sheet conveying; and
    a print head having a plurality of nozzles each configured to eject a droplet of ink onto the sheet, the print head configured to print a part of a print image in the partial printing,
    the method comprising:
    acquiring first image data representing a first image to be printed and second image data representing a second image to be printed with the first image data;
    determining, based on the first image, a plurality of head positions of the print head relative to the first image in the conveying direction;
    determining a relative position of the second image relative to the first image in the conveying direction such that, if the number of partial printings for printing the first image and the second image is increased from the number of partial printings for printing the first image, the relative position can minimize the increment;
    generating, using the first image data and the second image data, arrangement image data representing an arrangement image including the first mage and the second image positioned at the relative position relative to the first image; and
    supplying, to the printer, print image data based on the arrangement image data.

* * * * *

UNITED STATES PATENT AND TRADEMARK OFFICE
CERTIFICATE OF CORRECTION

PATENT NO.        : 10,315,436 B2
APPLICATION NO.   : 15/469621
DATED             : June 11, 2019
INVENTOR(S)       : Ryohei Ozawa Page 1 of 1

It is certified that error appears in the above-identified patent and that said Letters Patent is hereby corrected as shown below:

In the Claims

Column 18, Claim 1, Line 3 should read:
arrangement image including the first image and the Column 20, Claim 14, Line 22 should read:
arrangement image including the first image and the Column 20, Claim 15, Line 51 should read:
arrangement image including the first image and the Signed and Sealed this
Sixth Day of August, 2019

Andrei Iancu
*Director of the United States Patent and Trademark Office*